US010136461B2

United States Patent
Abe

(10) Patent No.: US 10,136,461 B2
(45) Date of Patent: Nov. 20, 2018

(54) COMMUNICATION DEVICE AND MASTER STATION DEVICE

(71) Applicant: Brother Kogyo Kabushiki Kaisha, Nagoya-shi, Aichi-ken (JP)

(72) Inventor: Akiko Abe, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 143 days.

(21) Appl. No.: 15/249,558

(22) Filed: Aug. 29, 2016

(65) Prior Publication Data

US 2017/0064756 A1    Mar. 2, 2017

(30) Foreign Application Priority Data

Aug. 31, 2015  (JP) ................................. 2015-170581

(51) Int. Cl.
*H04N 1/327* (2006.01)
*H04W 8/00* (2009.01)
(Continued)

(52) U.S. Cl.
CPC ........ *H04W 76/14* (2018.02); *H04N 1/32765* (2013.01); *H04N 1/32789* (2013.01);
(Continued)

(58) Field of Classification Search
CPC .... H04L 5/0007; H04L 5/1469; H04W 4/008; H04W 4/80; H04W 16/14; H04W 28/18;
(Continued)

(56) References Cited

U.S. PATENT DOCUMENTS 7,306,153 B2 * 12/2007 Chong .................. H04W 28/18
235/462.15
7,370,087 B1 * 5/2008 O'Toole, Jr. .......... H04L 67/025
709/217
(Continued)

FOREIGN PATENT DOCUMENTS

| CN | 101878671 A | * 11/2010 | ............ H04W 68/00 |
| JP | 2009-044701 A | 2/2009 | |
| WO | WO-2009069091 A1 | * 6/2009 | ............ H04W 68/00 |

OTHER PUBLICATIONS

"Wi-Fi Peer-to-Peer (P2P) Technical Specification, Version 1.1", Wi-Fi Alliance Technical Committee P2P Task Group, 2010, 159 pages.

*Primary Examiner* — Eric Nowlin
(74) *Attorney, Agent, or Firm* — Banner & Witcoff, Ltd.

(57) ABSTRACT

A communication device includes a processor and a memory storing wireless information used for establishing wireless connection with a specific access point and instructions. The instructions, when executed by the processor, cause the communication device to: search a first-type master station device for a first-type wireless network identified by a first predetermined character string; and search a second-type master station device for a second-type wireless network identified by a second predetermined character string in a case different from a case where the number of first-type target device found as a search result for the first-type master station device is one. The instructions, when executed, further causing the communication device to establish wireless connection with a second-type target device that is the second-type master station and join the second-type wireless network; and transmit the wireless information to the second-type target device by using the second-type wireless network.

12 Claims, 8 Drawing Sheets

(51) Int. Cl.
   *H04W 76/14* (2018.01)
   *H04W 84/12* (2009.01)
   *H04W 84/18* (2009.01)
(52) U.S. Cl.
   CPC ........... *H04N 2201/0027* (2013.01); *H04N 2201/0031* (2013.01); *H04N 2201/0055* (2013.01); *H04W 8/005* (2013.01); *H04W 84/12* (2013.01); *H04W 84/18* (2013.01)
(58) Field of Classification Search
   CPC ........... H04W 36/0066; H04W 36/165; H04W 56/00; H04W 72/042; H04W 72/044; H04W 72/1215
   See application file for complete search history.

(56) References Cited

U.S. PATENT DOCUMENTS

| | | | | |
|---|---|---|---|---|
| 7,724,712 B2* | 5/2010 | Yoshida | H04N 1/00278 | 370/338 |
| 7,822,412 B2* | 10/2010 | Lagnado | H04W 48/18 | 370/338 |
| 7,853,788 B2* | 12/2010 | Fascenda | H04L 9/3271 | 713/155 |
| 7,940,744 B2* | 5/2011 | Lehotsky | H04L 41/0886 | 358/1.15 |
| 8,050,709 B2* | 11/2011 | Hall | H04W 12/08 | 101/2 |
| 8,111,677 B2* | 2/2012 | Wentink | H04W 48/10 | 370/338 |
| 8,249,653 B2* | 8/2012 | Hall | H04W 12/08 | 101/2 |
| 8,284,421 B2* | 10/2012 | Lee | G06K 15/00 | 358/1.1 |
| 8,385,302 B2* | 2/2013 | Jain | H04W 48/12 | 370/338 |
| 8,457,085 B2* | 6/2013 | Izaki | H04W 8/20 | 370/338 |
| 8,665,848 B2* | 3/2014 | Wentink | H04W 48/10 | 370/338 |
| 8,966,601 B2* | 2/2015 | Green | H04L 9/0827 | 380/270 |
| 8,988,716 B1* | 3/2015 | Odean | G06F 3/1238 | 358/1.14 |
| 9,104,355 B2* | 8/2015 | Suzuki | G06F 3/1236 | |
| 9,226,328 B2* | 12/2015 | Ren | H04W 84/20 | |
| 9,244,641 B2* | 1/2016 | Ren | G06F 3/1236 | |
| 9,307,574 B2* | 4/2016 | Nogawa | H04W 84/12 | |
| 9,389,815 B2* | 7/2016 | Moriyama | G06F 3/1204 | |
| 9,503,592 B2* | 11/2016 | Fein | G06F 3/1204 | |
| 9,594,532 B2* | 3/2017 | Kim | | |
| 9,596,365 B2* | 3/2017 | Abe | H04W 48/16 | |
| 9,661,167 B2* | 5/2017 | Misumi | H04N 1/00888 | |
| 9,832,596 B2* | 11/2017 | Huang | H04L 67/16 | |
| 9,844,084 B2* | 12/2017 | Tsujii | H04W 76/023 | |
| 9,860,417 B2* | 1/2018 | Terashita | H04W 76/14 | |
| 9,986,591 B2* | 5/2018 | Yada | H04W 76/36 | |
| 2004/0141487 A1* | 7/2004 | Lee | G06K 15/00 | 370/338 |
| 2005/0239463 A1* | 10/2005 | Lagnado | H04W 48/18 | 455/435.2 |
| 2006/0067295 A1* | 3/2006 | Lehotsky | H04W 28/18 | 370/351 |
| 2006/0073847 A1* | 4/2006 | Pirzada | H04W 88/06 | 455/556.2 |
| 2006/0105714 A1* | 5/2006 | Hall | H04W 12/08 | 455/41.3 |
| 2007/0146782 A1* | 6/2007 | Lehotsky | H04L 41/0886 | 358/1.15 |
| 2007/0249331 A1* | 10/2007 | Sinivaara | H04L 67/10 | 455/418 |
| 2008/0024591 A1* | 1/2008 | Doi | H04W 8/245 | 348/14.01 |
| 2008/0104399 A1* | 5/2008 | Fascenda | H04L 9/3271 | 713/168 |
| 2008/0261640 A1* | 10/2008 | Yoshida | H04N 1/00278 | 455/517 |
| 2009/0046686 A1* | 2/2009 | Izaki | H04W 8/20 | 370/338 |
| 2009/0323569 A1* | 12/2009 | Wentink | H04W 48/10 | 370/311 |
| 2010/0115108 A1* | 5/2010 | Wang | H04W 8/265 | 709/228 |
| 2010/0131687 A1* | 5/2010 | Li | H04W 4/18 | 710/106 |
| 2011/0170468 A1* | 7/2011 | Jain | H04W 48/12 | 370/312 |
| 2012/0044536 A1* | 2/2012 | Hall | H04W 12/08 | 358/1.15 |
| 2012/0134310 A1* | 5/2012 | Wentink | H04W 48/10 | 370/311 |
| 2013/0014232 A1* | 1/2013 | Louboutin | H04M 1/72527 | 726/5 |
| 2013/0081121 A1* | 3/2013 | Green | H04L 9/0827 | 726/7 |
| 2013/0215467 A1* | 8/2013 | Fein | G06F 3/1204 | 358/1.15 |
| 2013/0260683 A1* | 10/2013 | Suzuki | H04W 76/10 | 455/41.1 |
| 2013/0321856 A1* | 12/2013 | Bell | G06F 3/122 | 358/1.15 |
| 2014/0281623 A1* | 9/2014 | Zhang | G06F 1/3234 | 713/323 |
| 2014/0349578 A1* | 11/2014 | Huang | H04L 67/16 | 455/41.2 |
| 2015/0031404 A1* | 1/2015 | Yada | H04W 76/25 | 455/508 |
| 2015/0065157 A1* | 3/2015 | Homchaudhuri | H04W 72/082 | 455/452.1 |
| 2015/0077798 A1* | 3/2015 | Ren | G06F 3/1236 | 358/1.15 |
| 2015/0169269 A1* | 6/2015 | Ueda | G06F 3/1236 | 358/1.15 |
| 2015/0188609 A1* | 7/2015 | Inoue | H04B 5/0037 | 455/41.1 |
| 2015/0189112 A1* | 7/2015 | Misumi | H04N 1/00888 | 358/1.14 |
| 2015/0288835 A1* | 10/2015 | Fein | G06F 3/1204 | 358/1.15 |
| 2015/0359021 A1* | 12/2015 | Tsujii | H04W 76/023 | 455/41.1 |
| 2016/0073309 A1* | 3/2016 | Iwanaga | H04W 36/08 | 370/331 |
| 2016/0227535 A1* | 8/2016 | Sharma | H04W 72/0453 | |
| 2017/0041935 A1* | 2/2017 | Shanmugam | H04W 24/02 | |
| 2018/0211026 A1* | 7/2018 | Gordon | G06F 21/34 | |

* cited by examiner

FIG. 1
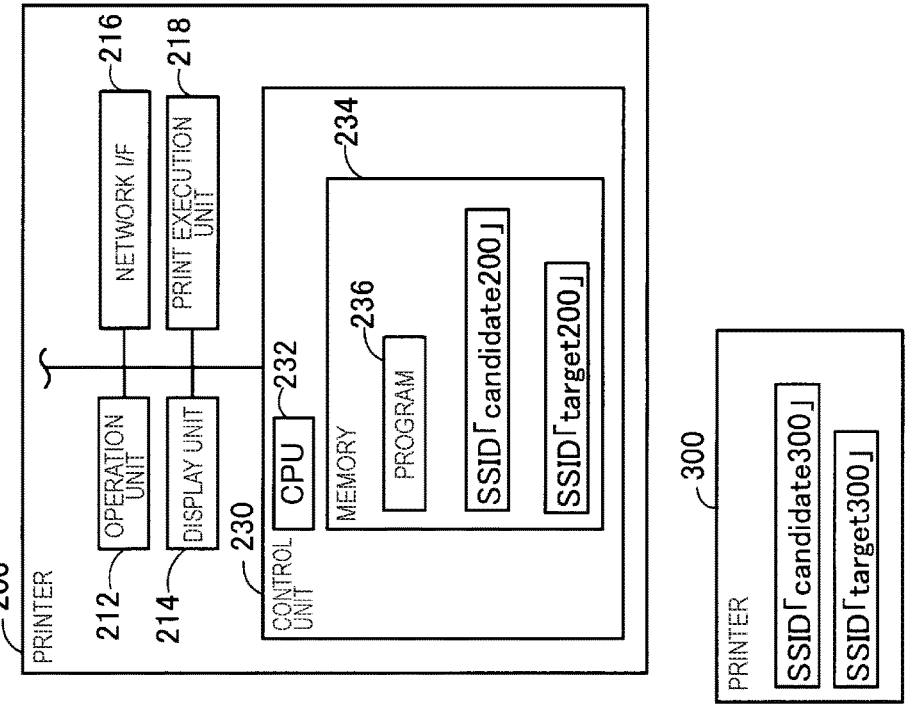
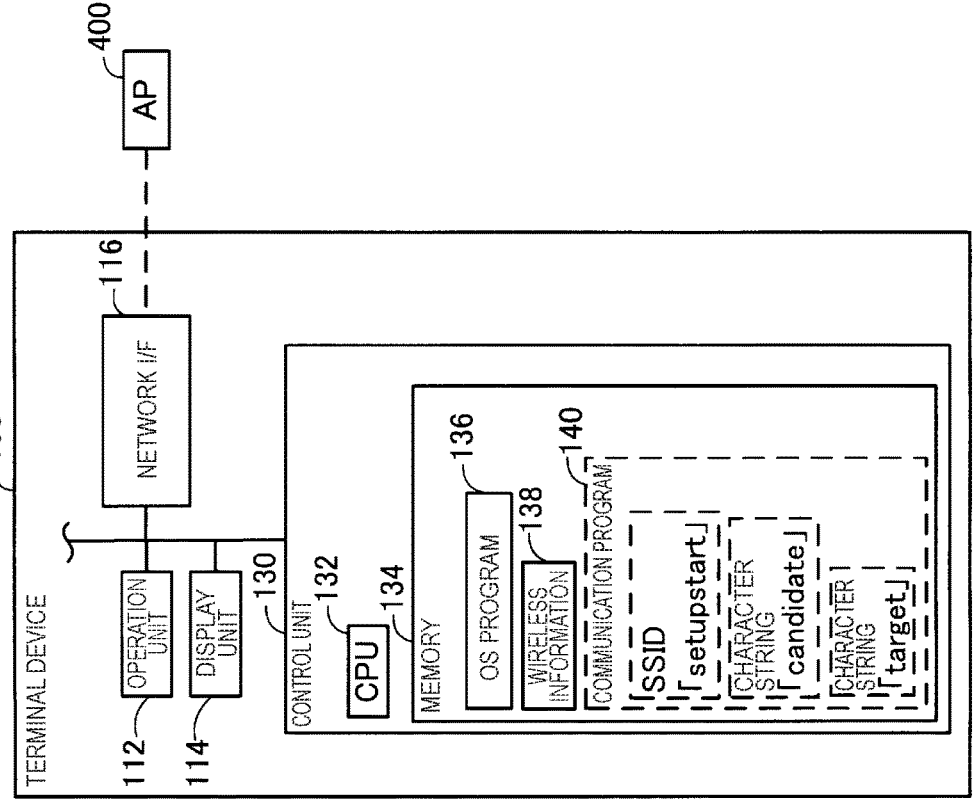

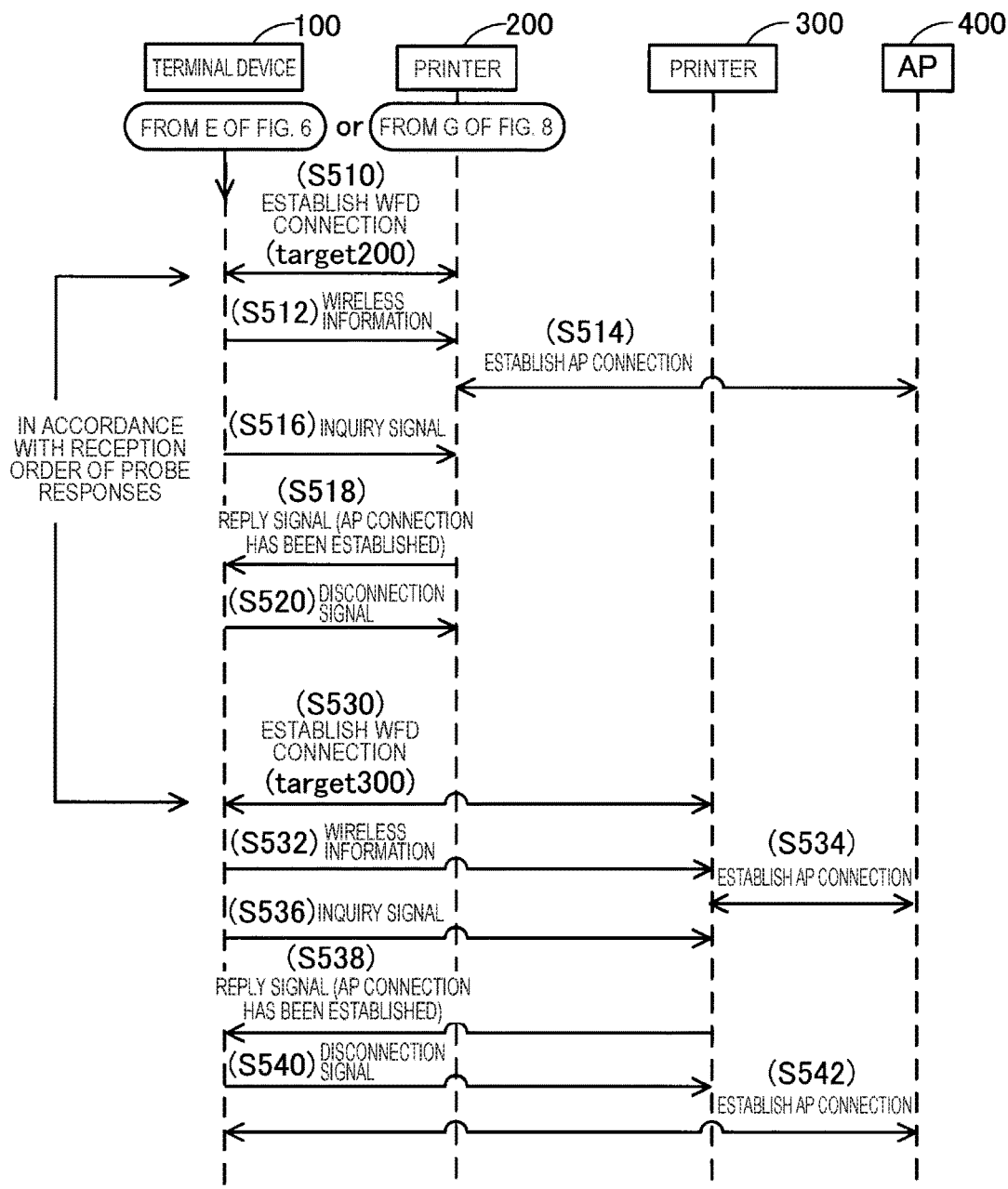

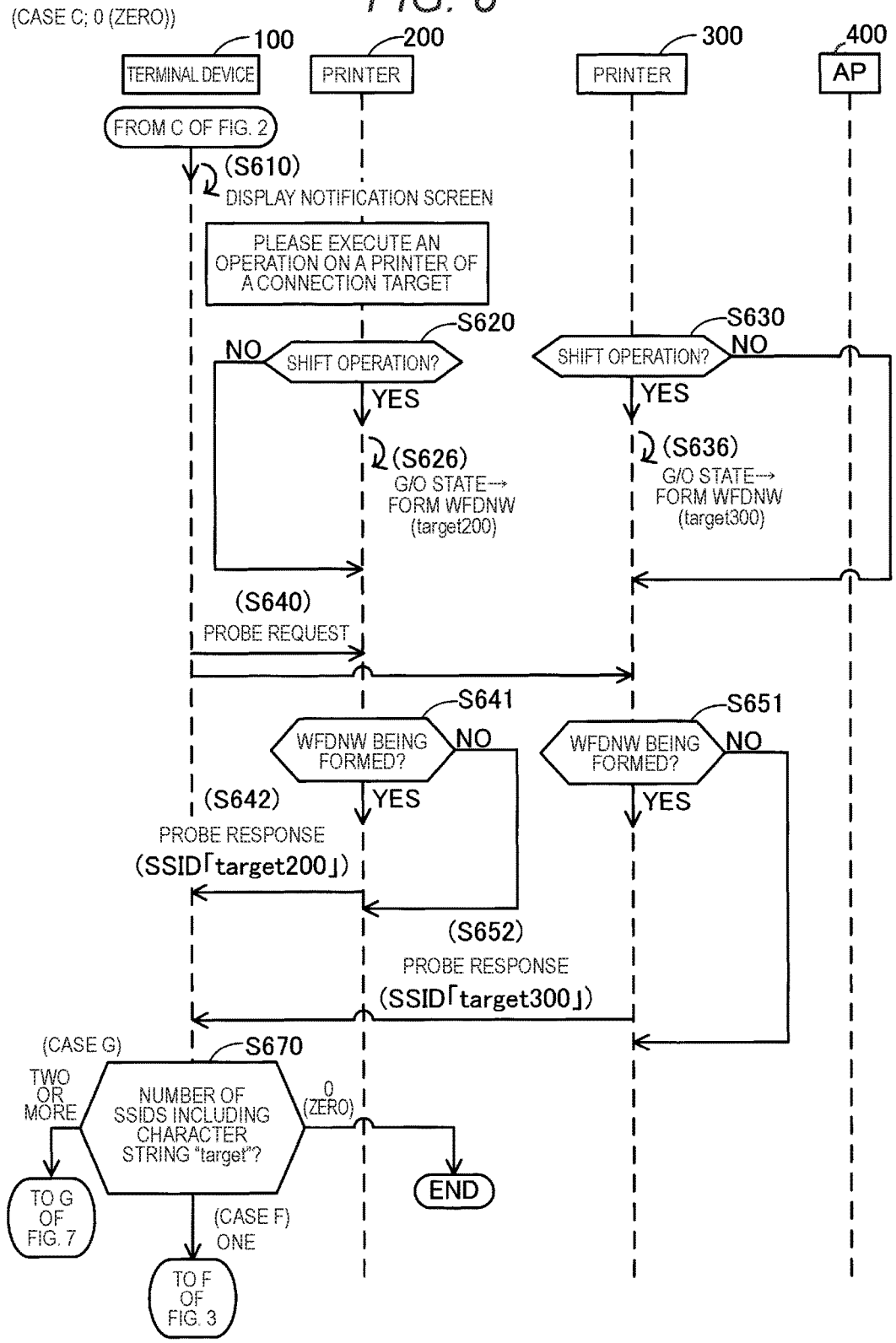

COMMUNICATION DEVICE AND MASTER STATION DEVICE

CROSS-REFERENCE TO RELATED APPLICATION

This application claims priorities from Japanese Application Publication No. 2015-170581 filed on Aug. 31, 2015, the entire subject matter of which is incorporated herein by reference.

TECHNICAL FIELD

The specification discloses a master station device capable of operating as a master station of a wireless network and a communication device capable of establishing wireless connection with the master station device.

BACKGROUND

There has been disclosed a related-art technology in which, a first printer is configured to establish wireless connection with an access point and to store therein a network wireless setting for establishing wireless connection with the access point and, upon receiving broadcast transmission of device specifying data from a second printer, the first printer displays information (i.e., a MAC address and a device type name) of the second printer in the data. When the information of the second printer is selected by a user, the first printer transmits the network wireless setting to the second printer by using an ad hoc wireless setting.

SUMMARY

There may be provided a communication device comprising: a communication interface; a processor; and a memory storing therein wireless information and instructions, the wireless information being used for establishing wireless connection with a specific access point, the instructions, when executed by the processor, causing the communication device to perform: searching a first-type master station device, the first-type master station device being configured to operate as a master station of a first-type wireless network, the first-type wireless network being identified by a wireless identifier comprising a first predetermined character string; searching a second-type master station device in a second case, the second case being different from a first case where the number of first-type target device, which is the first-type master station device, found as a search result for the first-type master station device is one, the second-type master station device being configured to operate as a master station of a second-type wireless network, the second-type wireless network being identified by a wireless identifier comprising a second predetermined character string that is different from the first predetermined character string; when the number of second-type target device, which is the second-type master station device, found as a search result for the second-type master station device is one, establishing wireless connection with the second-type target device and joining the second-type wireless network, the second-type target device being configured to shift from a first state to a second state after the searching of the first-type master station device, the first state being a state where the second-type target device does not operate as a master station of the second-type wireless network, the second state being a state where the second-type target device operates as a master station of the second-type wireless network; and transmitting the wireless information to the second-type target device by using the second-type wireless network.

According to the above configuration, in a case different from the case that the number of the first-type target device, which is the first-type master station device, found as the search result for the first-type master station device is one (i.e., when it is not possible to specify a transmission destination of the wireless information), the communication device searches the second-type master station device. As a result, the communication device can appropriately specify only the one second-type target device, which is the second-type master station device, as the search result for the second-type master station device. Therefore, the communication device can establish wireless connection with the second-type target device and appropriately transmit the wireless information to the second-type target device.

There may be provided a master station device configured to operate as a master station of a wireless network, the master station device comprising: an operation device; a processor; and a memory storing therein a first wireless identifier, a second wireless identifier that is different from the first wireless identifier and instructions, when executed by the processor, causing the master station device to perform: shifting a state of the master station device from a non-master state where the master station device does not operate as a master station of a first-type wireless network to be identified by the first wireless identifier to a first master state where the master station device operates as a master station of the first-type wireless network; shifting the state of the master station device from the first master state to a second master state where the master station device operates as a master station of a second-type wireless network to be identified by the second wireless identifier in response to the operation device receiving a shift operation while the master station device is at the first master state; establishing wireless connection with a communication device and joining the communication device to the second-type wireless network as a slave station, while the master station device is at the second master state; receiving wireless information from the communication device by using the second-type wireless network, the wireless information being used when the communication device has established wireless connection with an access point; and establishing wireless connection with the access point by using the wireless information.

According to the above configuration, since the master station device shifts to the first master station state, if the communication device executes the search using the first wireless identifier, the master station device can be found by the communication device. Thereafter, when the communication device cannot specify the master station device as a transmission destination of the wireless information, if the shift operation is executed on the master station device, the master station device shifts from the first master station state to the second master station state. As a result, if the communication device executes a search using the second wireless identifier, the master station device can be found by the communication device. In this way, since the master station device shifts from the first master station state to the second master station state, the communication device can appropriately specify the master station device as a transmission destination of the wireless information. Also, the master station device can establish wireless connection with the communication device, enable the communication device to connect to the second-type wireless network, as a slave station, and appropriately receive the wireless information from the communication device.

A control method, a computer program and a non-transitory computer-readable recording medium configured to store therein the computer program for implementing the communication device or the master station device are also novel and useful. A communication system including the communication device and the master station device is also novel and useful.

BRIEF DESCRIPTION OF THE DRAWINGS

In the accompanying drawings:

FIG. 1 depicts a configuration of a communication system;

FIG. 7 is a sequence diagram of cases E and G of the second illustrative embodiment in which connection with two or more printers is established; and FIG. 8 is a sequence diagram of the case C of the second illustrative embodiment.

DETAILED DESCRIPTION

Figure 2:
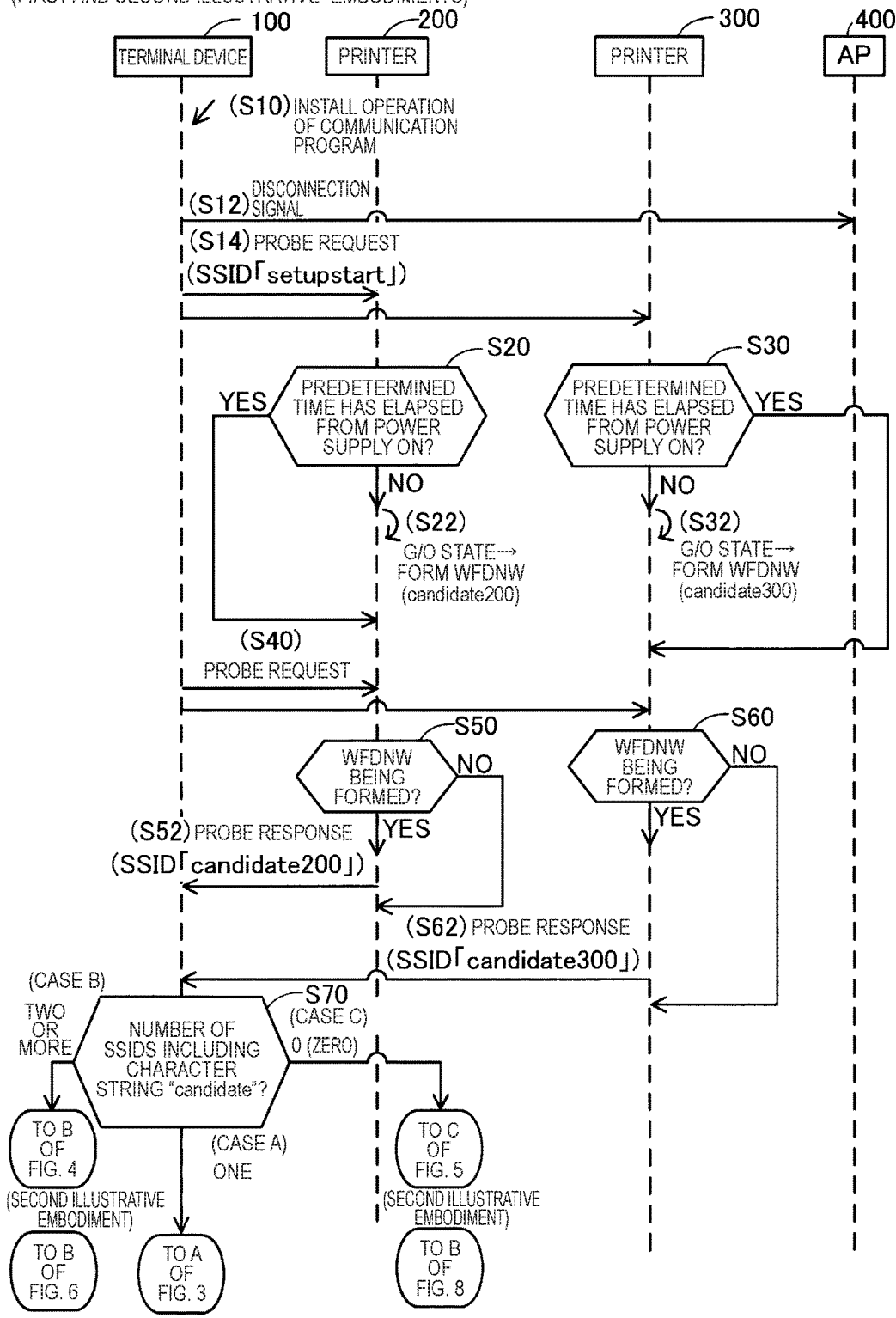
FIG. 2 is a sequence diagram when a terminal device searches for printers by using a character string "candidate;"

The above-described related-art technology does not disclose situations where two or more candidate devices are found and any one candidate device is not found as a result that the first printer searches candidate devices, which are candidates of a transmission destination of the network wireless setting. The above-described related-art technology does not assume a situation where it is not possible to specify the transmission destination of the network wireless setting as a search result for the candidate devices. Therefore, this specification provides a technology by which a communication device can implement communication of wireless information from a communication device to a transmission destination device by appropriately specifying the transmission destination device, which is a transmission destination of the wireless information.

First Illustrative Embodiment (Configuration of Communication System 2)

As shown in FIG. 1, a communication system 2 includes a terminal device 100 and a plurality of printers 200, 300. The terminal device 100 is configured to establish wireless connection (hereinafter, referred to as "AP connection") with an AP (abbreviation of Access Point) 400, and to join a wireless network (hereinafter, referred to as "AP network") in which the AP 400 operates as a master station. Also, the terminal device 100 can establish wireless connection (hereinafter, referred to as "WFD connection") with each of the printers 200, 300 in accordance with a WFD (abbreviation of Wi-Fi Direct (registered trademark)) method. The terminal device 100 cannot establish wireless connection with a plurality of devices at the same time. In this case, the terminal device 100 can join a wireless network (hereinafter, referred to as "WFD network") in which each of the printers 200, 300 operates as a master station. Also, each of the printers 200, 300 can establish wireless connection with a plurality of devices at the same time. Furthermore, in the following, the network may also be denoted as NW.

(Configuration of Terminal Device 100)

The terminal device 100 is a floor-standing type terminal device such as a desktop PC. In a modified embodiment, the terminal device 100 may be a portable terminal device such as a notebook, a tablet PC or the like. The terminal device 100 has an operation unit 112, a display unit 114, a network interface 116 and a control unit 130. The operation unit 112 has a keyboard and a mouse, and can provide the terminal device 100 with a variety of instructions by receiving a user's operation. The display unit 114 is a display for displaying a variety of information. In the below, the interface is denoted as "I/F."

The network I/F 116 is an interface I/F for performing wireless communication in accordance with a Wi-Fi method. The Wi-Fi method is a wireless communication method based on standards defined by Wi-Fi Alliance. For example, the Wi-Fi method is a wireless communication method based on 802.11 standards of IEEE (abbreviation of The Institute of Electrical and Electronics Engineers, Inc.) and standards (for example, 802. 11a, 11b, 11g, 11n and the like) conforming to the 802.11 standards. The network I/F 116 is configured to support a WFD method set by Wi-Fi Alliance. The details of the WFD method are described in "Wi-Fi Peer-to-Peer (P2P) Technical Specification Version 1.1" prepared by Wi-Fi Alliance. Also, the details of the WFD method are disclosed in U.S. Patent Application Publication No. 2013/0260683, which is herein incorporated for reference.

The control unit 130 has a CPU 132 and a memory 134. The CPU 132 is configured to execute a variety of processing, in response to an OS (abbreviation of Operating System) program 136 stored in the memory 134. The memory 134 consists of a ROM, a RAM, a hard disk and the like.

The memory 134 stores therein wireless information 138 when the terminal device 100 has established AP connection with the AP 400. The wireless information 138 is information that has been used when the terminal device 100 has actually established the AP connection, and includes an SSID (abbreviation of Service Set Identifier) of APNW, a password, a MAC address of the AP 400 and the like.

The memory 134 may be configured to further store therein a communication program 140. The communication program 140 is a program for enabling the printers 200, 300 to perform communication with the other devices, and is installed in the terminal device 100 from a server (not shown) on the Internet provided by a vendor of the printer 200, and the like. In a modified embodiment, the communication program 140 may be installed in the terminal device 100 from a medium that is to be shipped together with the printer 200 and the like.

The communication program 140 includes an SSID "setupstart", a character string "candidate" and a character string "target." The SSID "setupstart" is an SSID for instructing the printer 200 and the like to form a WFDNW. The character string "candidate" and the character string "target" are information that is to be used for searching a printer configured to operate as a master station (i.e., G/O (abbreviation of Group Owner) device) of the WFDNW.

(Configuration of Printers 200, 300)

The printer 200 has an operation unit 212, a display unit 214, a network I/F 216, a print execution unit 218 and a control unit 230. The operation unit 212 has a plurality of keys, and can provide the printer 200 with a variety of instructions by receiving a user's operation. The display unit 214 is a display for displaying a variety of information. The network I/F 216 is an interface I/F for performing wireless communication in accordance with the Wi-Fi method (particularly, wireless communication in accordance with the WFD method). The print execution unit 218 is a print mechanism of an inkjet type, a laser type or the like.

The control unit 230 has a CPU 232 and a memory 234. The CPU 232 is configured to execute a variety of processing, in response to a program 236 stored in the memory 234. The memory 234 consists of a ROM, a RAM, a hard disk and the like. In the memory 234, two SSIDs "candidate200" and "target200" are stored in advance from the shipment stage of the printer 200. Each of the two SSIDs "candidate200" and "target200" is an SSID of the WFDNW in which the printer 200 is configured to operate as a master station.

The printer 300 has the same configuration as the printer 200. However, the printer 300 has an SSID "candidate300" and an SSID "target300" stored therein beforehand. Of the respective SSIDs stored in the respective printers 200, 300, the character strings "candidate" and "target" are character strings that are to be commonly used in the plurality of printers 200, 300. Also, the character strings "200" and "300" are unique character strings allotted to the respective printers 200, 300.

(Configuration of AP 400)

The AP 400 is a well-known AP referred to as a wireless AP, a wireless LAN router or the like. The AP 400 is configured to relay communication between a pair of devices having established AP connection with the AP 400, i.e., a pair of slave stations (for example, the terminal device 100 and the printer 200) of the APNW.

(Processing of Respective Devices 100 to 400 and the Like: FIGS. 2 to 5)

Subsequently, respective processing that is to be executed by the terminal device 100 and the like is described with reference to FIGS. 2 to 5. The below processing is to transmit the wireless information 138 in the terminal device 100 to a target printer (for example, the printer 200) by using the WFD connection and to enable the target printer to join the APNW. At an initial state of FIG. 2, the terminal device 100 establishes AP connection with the AP 400. In the meantime, the respective communications that are to be executed by the terminal device 100 and the printer 200 are communications that are to be performed via the network I/Fs 116, 216. In the below, the description "via the network I/F 116 (or 216)" is omitted.

In S10, the CPU 132 of the terminal device 100 receives an install operation for installing the communication program 140 into the terminal device 100. In this case, the CPU 132 installs and activates the program 140, and transmits a disconnection signal for disconnecting AP connection with the AP 400 to the AP 400 in S12. Thereby, the AP connection established between the terminal device 100 and the AP 400 is disconnected, and the terminal device 100 disconnects from the APNW. The reason that the terminal device 100 disconnects the AP connection is described. The terminal device 100 (i.e., the network I/F 216) cannot establish two or more connections at the same time. Since it is necessary to later establish WFD connection with a target printer, the terminal device 100 disconnects the AP connection. Then, in S14, the CPU 132 broadcasts a probe request transmission including the SSID "setupstart" in the program 140. The probe request is transmitted so as to instruct the printer 200 and the like to form a WFDNW.

When the probe request of S14 is received from the terminal device 100, the CPU 232 of the printer 200 determines whether the probe request has been received after predetermined time (for example, 5 minutes) has elapsed from the power supply ON of the printer 200, in S20. When the probe request has been received after the predetermined time has elapsed (YES in S20), the CPU 232 skips over S22 and proceeds to S40. In another instance, when the probe request has been received before the predetermined time has elapsed (NO in S20), the CPU 232 shifts an operating state of the printer 200 from a device state to a G/O state and forms a WFDNW, which is identified by the SSID "candidate200" in the memory 234, in S22. Furthermore in the following, a combination of the WFDNW and the SSID of the WFDNW may also be denoted as "WFDNW (candidate200)."

As described above, the CPU 232 forms the WFDNW (candidate200) only when the probe request is received before the predetermined time has elapsed from the power supply ON of the printer 200 (NO in S20). The reason is described in the following. In a situation where a result of the determination in S20 is NO, the time during which a user turns on the power supply of the printer 200 and then executes the install operation of S10 is relatively short. In this case, there is a high possibility that the user wants the wireless information 138 in the terminal device 100 to be transmitted to the printer 200, i.e., the user wants the printer 200 to join the APNW. Then, the wireless information 138 is communicated using the WFD connection established between the terminal device 100 and the printer 200. Therefore, the CPU 232 forms the WFDNW (candidate200) for preparation of establishment of the WFD connection. In another instance, in a situation where a result of the determination in S20 is YES, the time during which the user turns on the power supply of the printer 200 and then executes the install operation of S10 is relatively long. In this case, the possibility that the user wants the wireless information 138 to be transmitted to the printer 200 is low. Therefore, the CPU 232 does not execute processing of S22, so that the printer 200 does not shift to the G/O state. The power consumption of the G/O state is usually higher than the power consumption of the other states (for example, a device state, a client state and the like). Since the printer 200 does not shift to the G/O state, it is possible to save the power of the printer 200.

The processing of S30 is the same as the processing of S20, except that the main processing is done by the printer 300. In S32, the printer 300 shifts the operating state of the printer 300 from the device state to the G/O state and forms a WFDNW (candidate300), which is identified by the SSID "candidate300."

After a predetermined time elapses from the execution of S14, the CPU 132 broadcasts a probe request transmission, which does not include an SSID, in S40. This probe request is transmitted so as to search a master station (i.e., a device of the G/O state) in a wireless network NW existing around the terminal device 100.

When the probe request of S40 is received from the terminal device 100, the CPU 232 determines whether the WFDNW is being formed, i.e., whether the printer is operating as a master station, in S50. When the WFDNW (candidate200) is being formed (YES in S50), the CPU 232 transmits a probe response including the SSID "candidate200" of the WFDNW (candidate200) to the terminal device 100 in S52. In another instance, when the WFDNW (candidate200) is not being formed (NO in S50), the CPU 232 skips over S52.

The processing of S60 is the same as the processing of S50, except that the main processing is done by the printer 300. In S62, the printer 300 transmits a probe response including the SSID "candidate300" of the WFDNW (candidate300) to the terminal device 100.

In the meantime, the AP 400 also receives the probe request of S40 from the terminal device 100, and transmits a probe response including an SSID of the APNW to the terminal device 100. Since the corresponding communications do not influence following processing, the corresponding communications are not shown. In the below, the communication relating to the AP 400 may not be shown.

The CPU 132 stands by after the processing of S40 is executed until the predetermined time elapses. In S70, the CPU 132 specifies how many SSIDs (hereinafter, referred to as "candidate SSIDs"), which include a character string "candidate" coinciding with the character string "candidate" in the memory 134, have been found, based on the standby result for the predetermined time (i.e., a receiving situation of the probe response). In other words, the CPU 132 specifies the number of printers that are currently operating as the master station of the WFDNW identified by the candidate SSID (i.e., the number of printers that should be a transmission destination of the wireless information 138).

Figure 5:
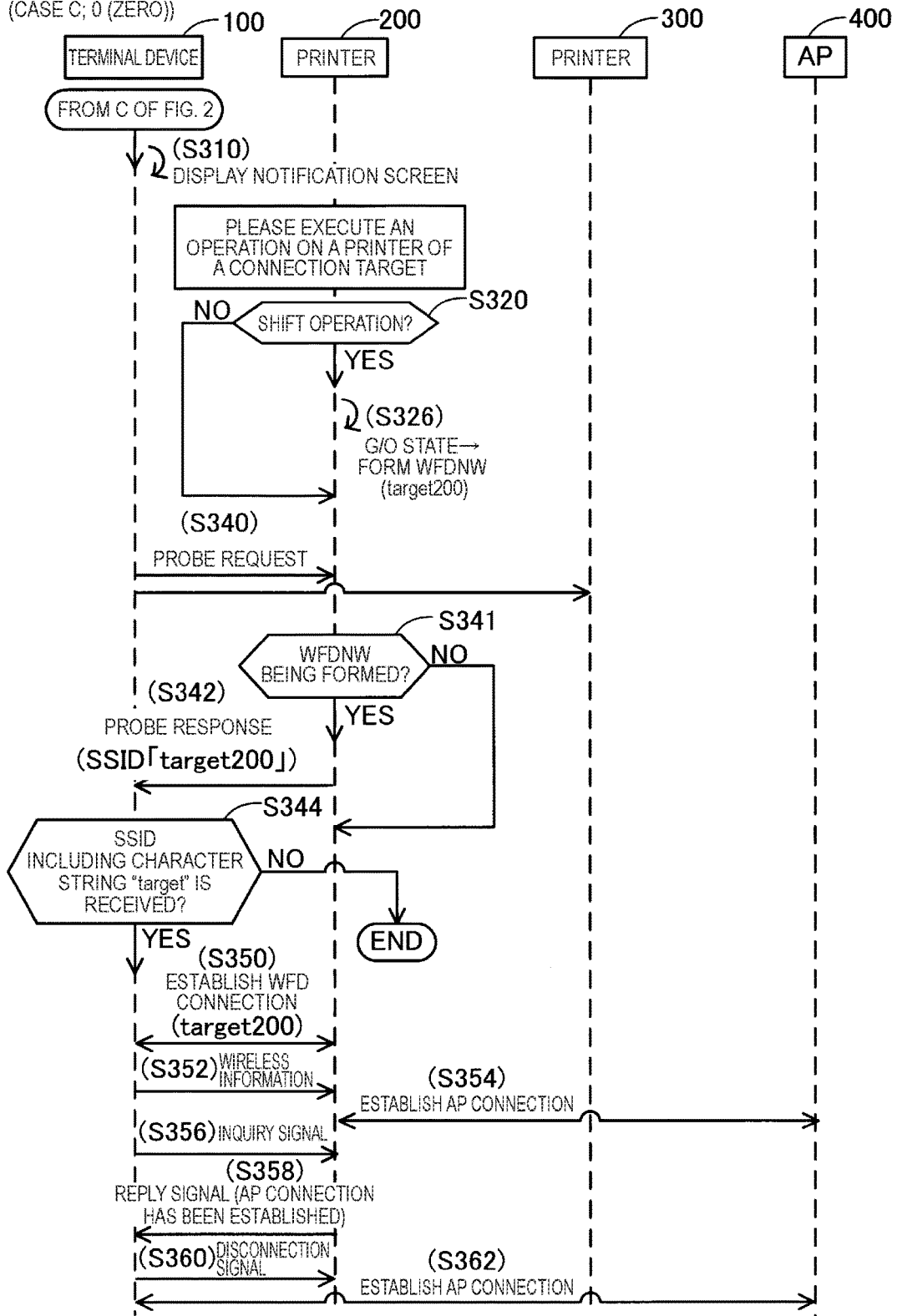
FIG. 5 is a sequence diagram of a case C in which any one printer is not found.

Specifically, when any one probe response is not received in the predetermined time, the CPU 132 determines that the candidate SSID has not been found (i.e., "0" in S70), and proceeds to a case C of FIG. 5. Also, when one or more probe responses have been received in the predetermined time but all the probe responses do not include the candidate SSID, the CPU 132 determines that the candidate SSID has not been found (i.e., "0" in S70), and proceeds to the case C of FIG. 5.

Figure 3:
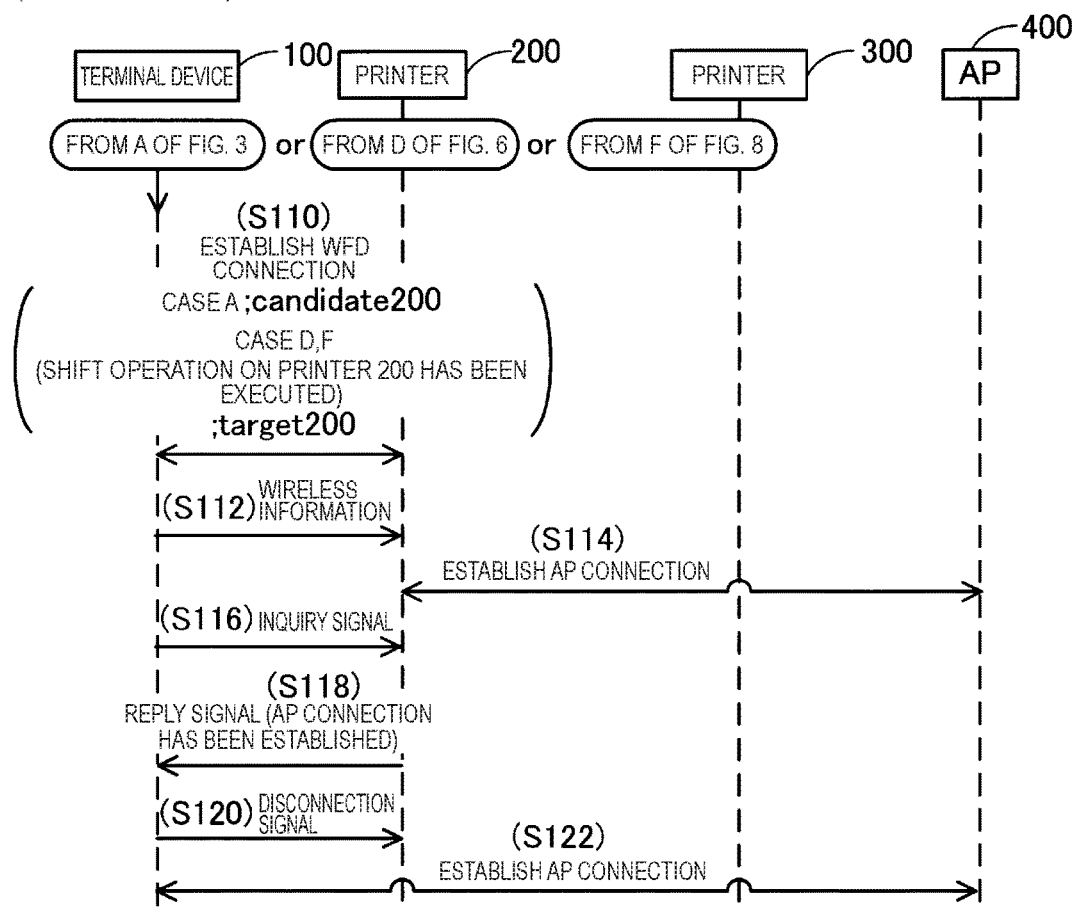
FIG. 3 is a sequence diagram of cases A, D and F in which only one printer is found.

When one or more probe responses are received in the predetermined time and only one of the probe responses includes the candidate SSID, the CPU 132 determines that only one candidate SSID has been found (i.e., "1" in S70), and proceeds to a case A of FIG. 3. Also, when two or more probe responses are received in the predetermined time and two or more of the two or more probe responses include the candidate SSID, respectively, the CPU 132 determines that two or more candidates SSIDs have been found (i.e., "two or more" in S70) and proceeds to a case B of FIG. 4.

(Case A; FIG. 3)

Subsequently, a case A where only one candidate SSID has been found in S70 of FIG. 2 is described with reference to FIG. 3. In the case A, it is assumed that only the SSID "candidate200" is found, i.e., the printer 300 does not operate as a master station (NO in S60 of FIG. 2) and the printer 200 operates as a master station (YES in S50).

In S110, the CPU 132 performs communication of various signals with the printer 200 and establishes WFD connection with the printer 200. The various signals include a probe request including the SSID "candidate200", a probe response, an Authentication signal, an Association signal, a 4-way handshake and the like, for example. Thereby, the terminal device 100 can join the WFDNW (candidate200) in which the printer 200 operates as a master station, as a slave station (i.e., a CL (abbreviation of Client) device). In S112, the CPU 132 transmits the wireless information 138 in the memory 134 to the printer 200 by using the WFD connection of S110, i.e., the WFDNW (candidate200).

When the wireless information 138 is received from the terminal device 100, the CPU 232 establishes AP connection with the AP 400 by performing communication of various signals, in S114. The various signals include a probe request including the SSID in the wireless information 138 (i.e., the SSID of the APNW), a probe response, an Authentication signal, an Association signal, a 4-way handshake and the like, for example. During the communication of various signals, a password in the wireless information 138 is transmitted to the AP 400, and authentication of the password is executed. In this way, the CPU 232 establishes AP connection with the AP 400 by using the wireless information 138. As a result, the printer 200 can join the APNW, as a slave station.

In S116, the CPU 132 transmits an inquiry signal for inquiring whether the AP connection has been established to the printer 200 by using the WFDNW (candidate200). When the inquiry signal is received from the terminal device 100, the CPU 232 transmits a reply signal, which indicates that the AP connection has been established, by using the WFDNW (candidate200), in S118.

When the reply signal is received from the printer 200, the CPU 132 transmits a disconnection signal to the printer 200 by using the WFDNW (candidate200) and disconnects WFD connection with the printer 200, in S120. As a result, the CPU 232 shifts the state of the printer 200 from the G/O state to the device state and nullifies the WFDNW (candidate200).

In S122, the CPU 132 establishes the AP connection by performing communication of various signals using the wireless information 138 in the memory 134. Thereby, the terminal device 100 can again take part in the APNW. A state where both the terminal device 100 and the printer 200 join the APNW is established. As a result, the CPU 132 can perform communication with the printer 200 by using the APNW (i.e., via the AP 400). For example, the CPU 132 can transmit image data to the printer 200 by using the APNW. In this case, when the image data is received from the terminal device 100, the CPU 232 can enable the print execution unit 218 to print an image represented by the image data.

Unlike the case A, a situation (YES in S60) where only the SSID "candidate300" is found, i.e., the printer 200 does not operate as a master station (NO in S50 of FIG. 2) and the printer 300 operates as a master station is also assumed. In this situation, the same processing as the processing of S110 to S122 is executed except that the printer 300, not the printer 200, does the main processing and the SSID "candidate300" instead of the SSID "candidate200" is used. Thereby, a state where both the terminal device 100 and the printer 300 join the APNW is established. As a result, the CPU 132 can perform communication with the printer 300 by using the APNW (i.e., via the AP 400).

As described above, when only one candidate SSID is found, i.e., only one printer, which should be a transmission destination of the wireless information 138, is found, the CPU 132 transmits the wireless information 138 to the printer and can enable the printer to take part in the APNW. Also, in this case A, the CPU 132 does not have to execute the search using a character string "target" different from the character string "candidate." The processing of S210 to S244 of FIG. 4 and S310 to S354 of FIG. 5 and the operations may not be executed. For this reason, the processing loads of the terminal device 100 and the printers 200, 300 are reduced and the user's convenience is improved.

Figure 4:
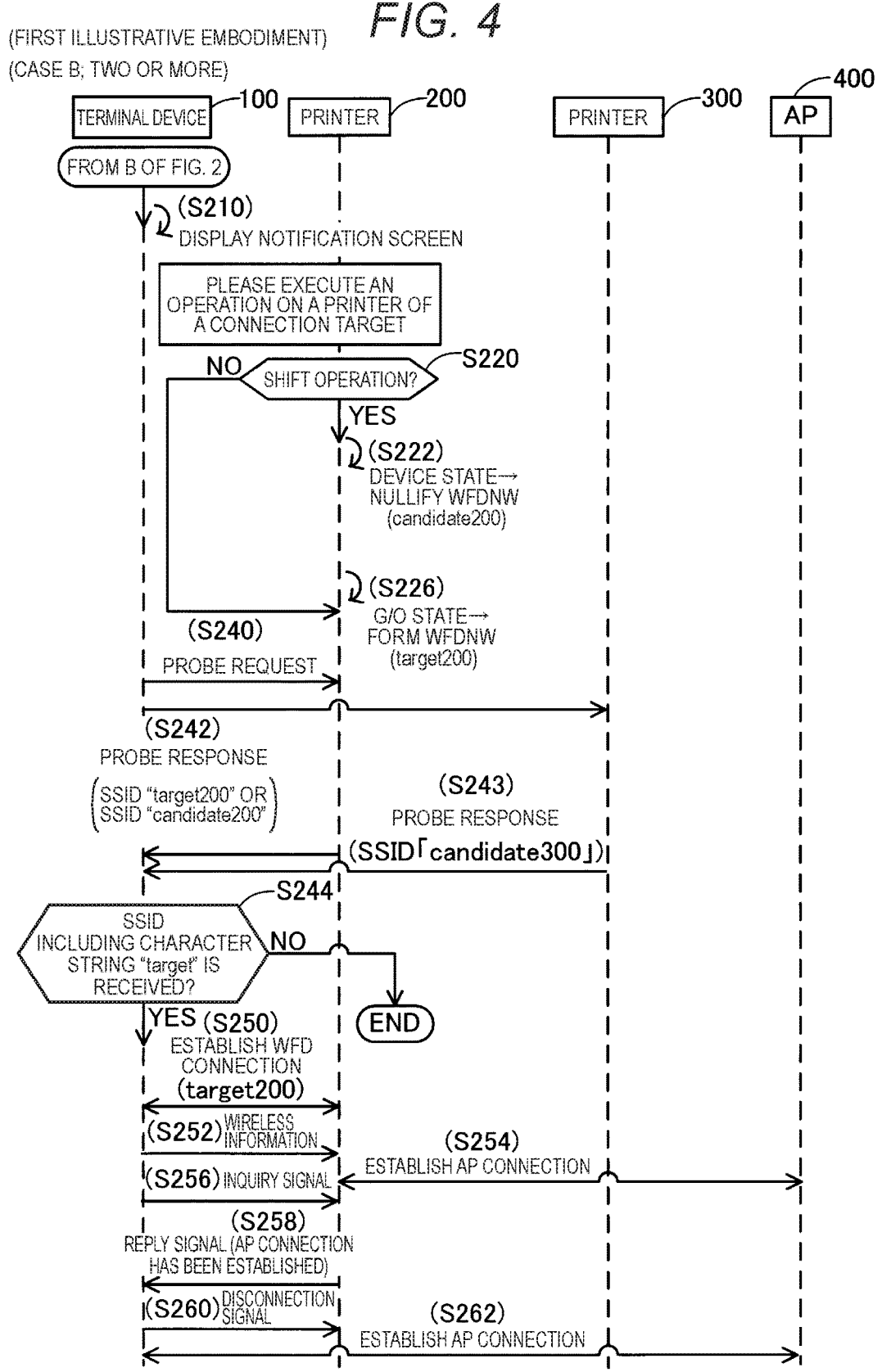
FIG. 4 is a sequence diagram of a case B in which two or more printers are found.

(Case B; FIG. 4)

Subsequently, a case B where two or more candidate SSIDs (i.e., the SSIDs "candidate200" and "candidate300") have been found in S70 of FIG. 2 is described with reference to FIG. 4. When two or more candidate SSIDs are found, the CPU 132 cannot specify a transmission destination of the wireless information 138. For this reason, the CPU 132 further executes a search using a character string "target" different from the character string "candidate."

In S210, the CPU 132 displays a notification screen on the display unit 114. The notification screen includes a message urging the user to execute a shift operation on a transmission destination printer (i.e., a target printer) that should be a transmission destination of the wireless information 138. The shift operation is an operation for shifting a state of the transmission destination printer from a state where the transmission destination printer does not operate as a master station of the WFDNW identified by an SSID (hereinafter, referred to as "target SSID") including the character string "target" to a state where the transmission destination printer operates as a master station of the WFDNW. The user can perceive that it is necessary to execute the shift operation on the transmission destination printer by seeing the notification screen.

When the user wants to select the printer 200 as a transmission destination printer, the user executes the shift operation on the printer 200. A state of the printer 200 before execution of the shift operation is a state where the printer 200 operates as a master station of the WFDNW (candidate200) (YES in S50 of FIG. 2). Also, a state of the printer 300 is a state where the printer 300 operates as a master station of the WFDNW (candidate300). In S220, the CPU 232 determines whether the shift operation has been executed on the printer 200. When the shift operation has been executed on the printer 200 (YES in S220), the CPU 232 proceeds to S222. In another instance, when the shift operation has not been executed on the printer 200 (NO in S220), the CPU 232 skips over S222 and S226.

In S222, the CPU 232 shifts the operating state of the printer 200 from the G/O state to the device state, and nullifies the WFDNW (candidate200). Then, in S226, the CPU 232 shifts the operating state of the printer 200 from the device state to the G/O state, and forms a WFDNW identified by the SSID "target200" in the memory 234.

In the meantime, the printer 300 also executes the respective processing corresponding to S220 to S226, like the printer 200. However, in this case B, since a situation where the shift operation is executed on the printer 300 is not assumed, the respective processing of the printer 300 is not shown. When executing the processing corresponding to S222, the printer 300 nullifies the WFDNW (candidate300). Also, when executing the processing corresponding to S226, the printer 300 forms a WFDNW identified by the SSID "target300."

When the predetermined time elapses after the processing of S210 is executed, the CPU 132 broadcasts a probe request transmission, that does not include an SSID in S240. This probe request is transmitted so as to search a master station (i.e., a device of the G/O state) in a wireless network NW existing around the terminal device 100.

When the probe request of S240 is received from the terminal device 100, the CPU 232 transmits a probe response to the terminal device 100, in S242. When the WFDNW (target200) has been formed (i.e., the shift operation has been executed on the printer 200 (YES in S220)), the probe response includes the SSID "target200." In another instance, when the WFDNW (candidate200) has been formed (i.e., the shift operation has not been executed on the printer 200 (NO in S220)), the probe response includes the SSID "candidate200."

In the case B, the printer 300 forms the WFDNW (candidate300). Therefore, when the probe request of S240 is received from the terminal device 100, the printer 300 transmits the probe response including the SSID "candidate300" to the terminal device 100, in S243.

In S244, the CPU 132 monitors whether a probe response including a target SSID, which includes the character string "target" coinciding with the character string "target" in the memory 134, is received. In other words, the CPU 132 searches a printer that operates as a master station of the WFDNW identified by the target SSID. Even when the operation unit 112 does not receive a user's operation after the processing of S70 of FIG. 2, the CPU 132 executes the search processing (i.e., S240 to S244) using the character string "target", which can improve the user's convenience. In a modified embodiment, when the operation unit 112 receives a user's predetermined operation after the processing of S70 of FIG. 2, the CPU 132 may execute the search processing using the character string "target."

When the probe response including the SSID "target200" is received from the printer 200 (YES in S244), i.e., when only one printer 200 that should be a transmission destination of the wireless information 138 is found, the CPU 132 proceeds to S250. In another instance, when the probe response including the SSID "candidate200" is received from the printer 200 (NO in S244), the CPU 132 does not execute respective processing of S250 to S262. In this case, the wireless information 138 is not transmitted from the terminal device 100 and the processing is over.

The processing of S250 to S262 is the same as the processing of S110 to S122 of FIG. 3, except that the SSID "target200" and the WFDNW (target200) are used instead of the SSID "candidate200" and the WFDNW (candidate200). Thereby, the terminal device 100 can transmit the wireless information 138 to the printer 200 by using the WFDNW (target200) (S252) and enable the printer 200 to join the APNW. As a result, a state where both the terminal device 100 and the printer 200 take part in the APNW is established (S262).

If the shift operation is executed on the printer 300, not the printer 200, the terminal device 100 can transmit the wireless information 138 to the printer 300 by using the WFDNW (target300) and enable the printer 300 to join the APNW. As a result, a state where both the terminal device 100 and the printer 300 take part in the APNW is established. Also, if the shift operation is executed on both the printers 200, 300, the probe response including the target SSID is transmitted from each of the printers 200, 300. In this case, the terminal device 100 establishes WFD connection with one of the printers 200, 300, which has first transmitted the probe response including the target SSID, and does not establish WFD connection with the other printer. Then, the terminal device 100 transmits the wireless information 138 to the former printer and enables the former printer to take part in the APNW. Even in this situation, the terminal device 100 can find only one printer (i.e., the former printer) that should be a transmission destination of the wireless information 138.

As described above, according to the case B, the terminal device 100 includes the character string "candidate." As a search result for the printer that operates as a master station of the WFDNW identified by the candidate SSID, the two printers 200, 300 are found (two or more in S40, S52, S62 and S70 of FIG. 2). In this case, since the terminal device 100 cannot specify a transmission destination of the wireless information 138, the terminal device 100 further searches a printer that operates as a master station of the WFDNW identified by the target SSID including the character string "target" (S240 to S244 in FIG. 4). As a result, the terminal device 100 can appropriately specify only one printer 200 (YES in S244). Therefore, the terminal device 100 can establish WFD connection with the printer 200 (S250), and appropriately transmit the wireless information 138 to the printer 200 (S252). In other words, the printer 200 can establish WFD connection with the terminal device 100, enable the terminal device 100 to connect to the WFDNW (target200) as a CL device (S250), and appropriately receive the wireless information 138 from the terminal device 100 (S252).

(Case C; FIG. 5)

Subsequently, a case C where the candidate SSID has not been found in S70 of FIG. 2 is described with reference to FIG. 5. Also in the case C, since the CPU 132 cannot specify a transmission destination of the wireless information 138, the CPU 132 executes a search using the character string "target." The processing of S310 to S340 is the same as the processing of S210 to S240 of FIG. 4. However, in the case C, since the printer 200 does not form the WFDNW (candidate200) (NO in S50 of FIG. 2), the printer 200 executes processing of S326 corresponding to S226 of FIG. 4 without executing processing corresponding to S222 of FIG. 4.

In S350, when the probe request of S340 is received from the terminal device 100, the CPU 232 determines whether the WFDNW (target200) is being formed, i.e., whether the printer operates as a master station of the WFDNW (target200). When the WFDNW (target200) is being formed (YES in S350), the CPU 232 transmits a probe response including the SSID "target200" to the terminal device 100, in S352. In another instance, when the WFDNW (target200) is not being formed (NO in S350), the CPU 232 skips over S352. In this case, respective processing of S350 to S362 is not executed. The wireless information 138 is not transmitted from the terminal device 100 and the processing is over.

The processing of S354 to S362 is the same as the processing of S244 to S262 of FIG. 4. Thereby, the terminal device 100 can transmit the wireless information 138 to the printer 200 by using the WFDNW (target200) (S352) and enable the printer 200 to join the APNW. As a result, a state where both the terminal device 100 and the printer 200 take part in the APNW is established (S362).

As described above, according to the case C, the terminal device 100 includes the character string "candidate." As a search result for the printer that operates as a master station of the WFDNW identified by the candidate SSID, no one printer is found ("0" in S40, S52, S62, S70 of FIG. 2). In this case, since the terminal device 100 cannot specify a transmission destination of the wireless information 138, the terminal device 100 further searches a printer that operates as a master station of the WFDNW identified by the target SSID including the character string "target" (S340, S352, S354). As a result, the terminal device 100 can appropriately specify only one printer 200 (YES in S354). Therefore, the terminal device 100 can establish WFD connection with the printer 200 (S360), and appropriately transmit the wireless information 138 to the printer 200 (S362). In other words, the printer 200 can establish WFD connection with the terminal device 100, enable the terminal device 100 to connect to the WFDNW (target200) as a CL device (S350), and appropriately receive the wireless information 138 from the terminal device 100 (S352).

(Correspondence Relation)

The terminal device 100 and the printer 200 are examples of the "communication device" and the "master station device", respectively. The character string "candidate" and the character string "target" are examples of the "first predetermined character string" and the "second predetermined character string", respectively. The SSID "candidate200" and the SSID "target200" are examples of the "first wireless identifier" and the "second wireless identifier", respectively. The WFDNW (candidate200) and the WFDNW (candidate300) are examples of the "first-type wireless network." The printer configured to operate as a master station of the WFDNW identified by the SSID including the character string "candidate" is an example of the "first-type target device." The WFDNW (target200) is an example of the "second-type wireless network." Also, the printer configured to operate as a master station of the WFDNW identified by the SSID including the character string "target" is an example of the "second-type target device."

The notification screen of S210 of FIG. 4 and S310 of FIG. 5 is an example of the "predetermined information." The probe request of S40 of FIG. 2, which does not include an SSID, the probe response of S52 and S62, and the probe request of S14 including the SSID "setupstart" are examples of the "search signal", the "response signal" and the "predetermined signal", respectively. The install operation of S10 is an example of the "predetermined operation."

Second Illustrative Embodiment

In the first illustrative embodiment, when the probe response including the target SSID is received from the printer 200 in S244 of FIG. 4 and S344 of FIG. 5, for example, the CPU 132 establishes WFD connection with the printer 200. Thereafter, even when the probe response including the target SSID is received from the printer 300, the CPU 132 does not establish WFD connection with the printer 300. Instead of this configuration, according to a second illustrative embodiment, in this situation, the CPU 132 establishes WFD connection with each of the printers 200, 300.

Figure 6:
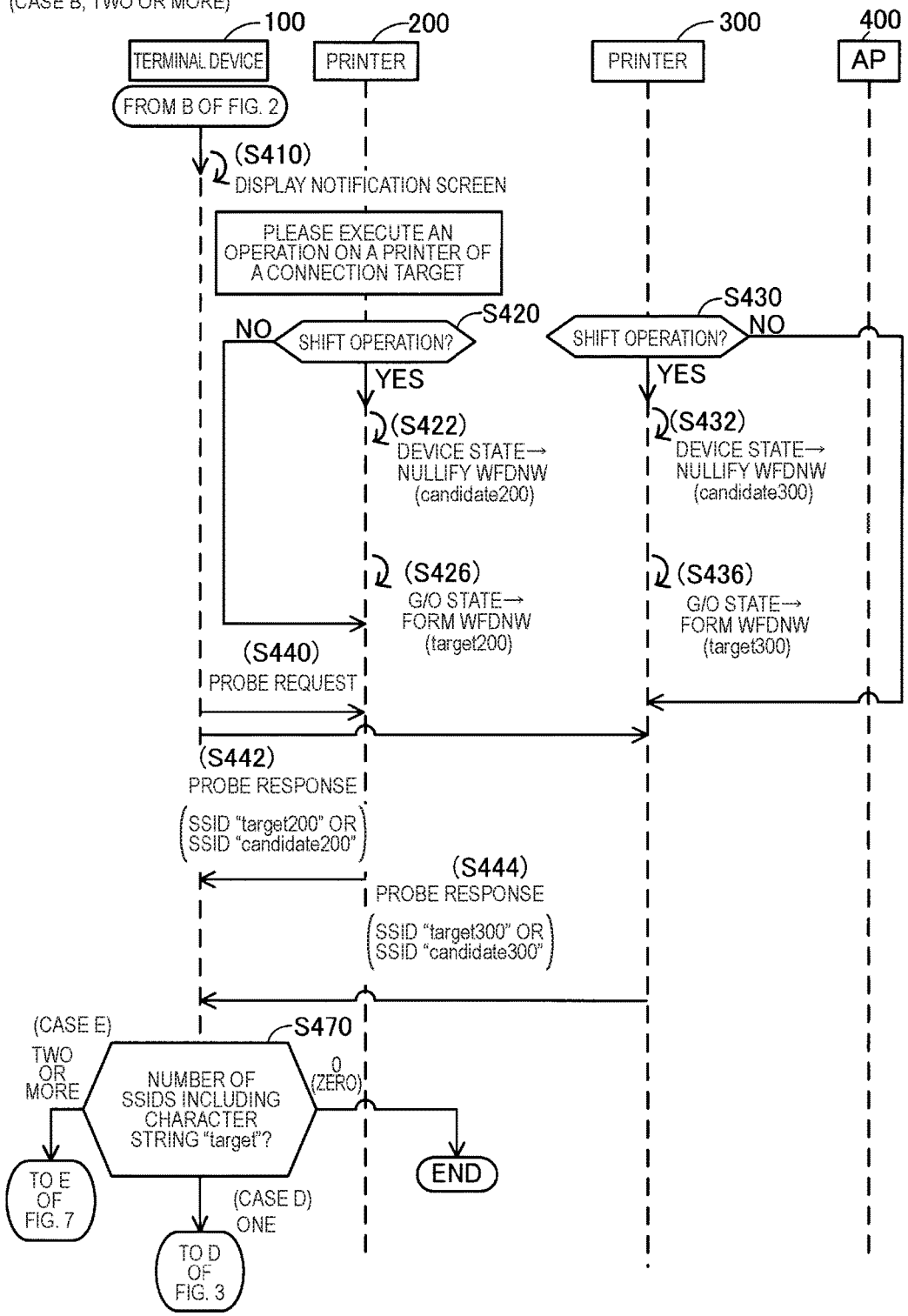
FIG. 6 is a sequence diagram of the case B of a second illustrative embodiment.

(Case B; FIG. 6)

The respective processing that is to be executed by the terminal device 100 and the like is described with reference to FIGS. 6 to 8. In the second illustrative embodiment, when two or more candidate SSIDs are found in S70 of FIG. 2, the CPU 132 proceeds to S410 of FIG. 6. The processing of S410 to S426 is the same as the processing of S210 to S226 of FIG. 4.

When the user selects the printer 200 as a transmission destination printer and also wants to select the printer 300 as a transmission destination printer, the user executes the shift operation on the printer 300. The processing of S430 is the same as the processing of S220 of FIG. 4, except that main processing is done by the printer 300. In S432, the printer 300 shifts the operating state of the printer 300 from the G/O state to the device state, and nullifies the WFDNW (candidate300). In S436, the printer 300 shifts the operating state of the printer 300 from the device state to the G/O state, and operates as a master station of the WFDNW (target300) identified by the SSID "target300." The processing of S440 and S442 is the same as the processing of S240 and S242 of FIG. 4.

When the probe request is received from the terminal device 100, the printer 300 transmits a probe response to the terminal device 100, in S444. When the WFDNW (target300) has been formed (i.e., the shift operation has been executed on the printer 300 (YES in S430)), the probe response includes the SSID "target300." In another instance, when the WFDNW (candidate300) has been formed (i.e., the shift operation has not been executed on the printer 300 (NO in S430)), the probe response includes the SSID "candidate300."

The CPU 132 stands by after the processing of S440 is executed until the predetermined time elapses. Then, in S470, the CPU 132 specifies how many target SSIDs, which include a character string "target", have been found, based on the standby result for the predetermined time (i.e., a receiving situation of the probe response). In other words, the CPU 132 specifies the number of printers that operate as a master station of the WFDNW identified by the target SSID (i.e., the number of printers that should be a transmission destination of the wireless information 138).

The CPU 132 receives at least two probe responses (S442, S444). When two or more probe responses are received in the predetermined time but all the two or more probe responses do not include the target SSID, the CPU 132 determines that the target SSID has not been found (i.e., "0" in S480), and ends the processing. In this case, the CPU 132 does not transmit the wireless information 138 externally.

When two or more probe responses are received in the predetermined time and only one of the two or more probe responses includes the target SSID, the CPU 132 determines that only one target SSID has been found (i.e., "1" in S470) and proceeds to a case D of FIG. 3.

For example, when the case D is executed as the shift operation is executed on the printer 200 (YES in S420), the SSID "target200" is used in S110 of FIG. 3. The other processing is the same as the case A of the first illustrative embodiment. As a result, the terminal device 100 can establish WFD connection with the printer 200 (S110), and appropriately transmit the wireless information 138 to the printer 200 (S112). Also, for example, when the case D is executed as the shift operation is executed on the printer 300 (YES in S430), the SSID "target300" is used in S110 of FIG. 3 (this case is not shown).

Also, when two or more probe responses are received in the predetermined time and these two or more probe responses include the target SSID, respectively, the CPU 132 determines that two or more target SSIDs have been found (i.e., "two or more" in S470) and proceeds to a case E of FIG. 7.

(Case; FIG. 7)

Subsequently, a case E where the two or more target SSIDs (i.e., the SSID "target200" and "target300") have been found in S470 of FIG. 6 is described with reference to FIG. 7. In the case E, a situation is assumed in which a probe response including the SSID "target200" is received from the printer 200 on which the shift operation has been first executed and then a probe response including the SSID "target300" is received from the printer 300 on which the shift operation has been later executed. The CPU 132 sequentially establishes WFD connections with the respective printers 200, 300 in first reception order of the probe responses. Specifically, since there is a high possibility that the user wants to preferentially establish WFD connection with the printer 200 on which the user has first executed the shift operation, the CPU 132 establishes WFD connection with the printer 200 and then establishes WFD connection with the printer 300. In a modified embodiment, the CPU 132 may sequentially establish the WFD connections after reception order of the probe responses, or may sequentially establish the WFD connections in random order, irrespective of the reception order of the probe responses.

The processing of S510 to S520 is the same as the processing of S110 to S120 of FIG. 3, except that the SSID "target200" is used. Thereby, the CPU 132 can establish WFD connection with the printer 200 (S510), transmit the wireless information 138 to the printer 200 by using the WFDNW (target200) (S512), and enable the printer 200 to join the APNW (S514). The processing of S530 to S540 is the same as the processing of S110 to S120 of FIG. 3, except that the printer 300, not the printer 200, does the main processing and the SSID "target300" is used. Thereby, the CPU 132 can establish WFD connection with the printer 300 (S530), transmit the wireless information 138 to the printer 300 by using the WFDNW (target300) (S532), and enable the printer 300 to join the APNW (S534). The processing of S542 is the same as the processing of S122 of FIG. 3. Thereby, a state where the terminal device 100, the printer 200 and the printer 300 take part in the APNW is established.

(Case C; FIG. 8)

Also, in the second illustrative embodiment, when the target SSID has not been found in S70 of FIG. 2, the CPU 132 proceeds to S610 of FIG. 8. The processing of S610 to S626 is the same as the processing of S310 to S326 of FIG. 5. The processing of S630 and S636 is the same as the processing of S430 and S436 of FIG. 6. The processing of S640 to S642 is the same as the processing of S340 to S342 of FIG. 5.

In S651, the printer 300 determines whether the WFDNW (target300) is being formed, i.e., whether the printer is operating as a master station of the WFDNW (target300). When the WFDNW (target300) is being formed (YES in S651), the printer 300 transmits a probe response including the SSID "target300" to the terminal device 100 in S652.

The processing of S670 is the same as the processing of S470 of FIG. 6. When it is determined that the target SSID has not been found (i.e., "0" in S670), the CPU 132 ends the processing. In this case, the CPU 132 does not transmit the wireless information 138 externally. Also, when only one target SSID has been found, the CPU 132 proceeds to a case F of FIG. 3. For example, when the case F is executed as the shift operation is executed on the printer 200 (YES in S620), the SSID "target200" is used in S110 of FIG. 3. Also, for example, when the case F is executed as the shift operation is executed on the printer 300 (YES in S630), the SSID "target300" is used in S110 of FIG. 3 (this case is not shown). Also, when two or more target SSIDs have been found ("two or more" in S670), the CPU 132 proceeds to a case G of FIG. 7 and establishes WFD connection with each of the printers 200, 300.

According to the second illustrative embodiment, when two or more target SSIDs have been found ("two or more" in S470 of FIG. 6 or S670 of FIG. 8), the terminal device 100 establishes WFD connection with each of the printers 200, 300 (S510, S530 of FIG. 7) and transmits the wireless information 138 to each of the printers 200, 300 (S512, S532). As a result, the terminal device 100 can enable each of the printers 200, 300 to join the APNW (S514, 534).

<Modifications to Illustrative Embodiments>

Although the specific examples of the present disclosure have been described in detail, they are just exemplary and do not limit the claims. The technologies defined in the claims include a variety of changes and modifications to the specific examples. Modified embodiments of the illustrative embodiments are described as follows.

Modified Embodiment 1

In the respective illustrative embodiments, when two or more candidate SSIDs have been found and when no candidate SSID have been found, the terminal device 100 searches a printer that operates as a master station of WFDNW identified by the target SSID (Case B of FIGS. 4 and 6, Case C of FIGS. 5 and 8). In a modified embodiment, when two or more candidate SSIDs have been found, the corresponding printer may be searched, and when no candidate SSID has been found, the processing may be over without searching the corresponding printer. When no one first-type master station device has been found, the "second search unit" may not search the second-type master station device.

In another modified embodiment, when no candidate SSID has been found, the terminal device 100 may search the corresponding printer, and when two or more candidate SSIDs have been found, the terminal device 100 may end the processing without searching the corresponding printer. When two or more first-type master station devices have been found, the "second search unit" may not search the second-type master station device.

Modified Embodiment 2

The network I/F 216 of the printer 200 may not support the WFD method, and instead may support a so-called Soft AP. In this case, the printer 200 may be configured to activate the Soft AP and to form a wireless network NW where the printer 200 operates as an AP, in S22 of FIG. 2, S226 of FIG. 4, S326 of FIG. 5, S426 of FIG. 6 and S626 of FIG. 8. The printer 200 may be configured to enable the terminal device 100 to connect to the wireless network NW that is to be formed as the Soft AP is activated, and may receive the wireless information 138 from the terminal device 100 by using the wireless network NW. The "master station" is not limited to a G/O device, and may be an AP, for example.

Modified Embodiment 3

In S210 of FIG. 4, the terminal device 100 may be configured to broadcast a transmission signal for instructing a display of the notification screen (for example, a probe request including an SSID "display") without displaying the notification screen. In this case, when the signal is received from the terminal device 100, each of the printers 200, 300 may display the same notification screen as S210. The "output unit" may be the display unit 114 of the terminal device 100, like the illustrative embodiments, and may be the display unit 214 of each of the printers 200, 300.

Modified Embodiment 4

In S210 of FIG. 4, the terminal device 100 may be configured not to display the notification screen. In this case, the user may execute the shift operation on the printer without seeing the notification screen. The "output unit" and the "output control unit" may be omitted.

Modified Embodiment 5

In S40 of FIG. 2, the terminal device 100 may be configured to not broadcast the probe request transmission. When each of the printers 200, 300 forms a WFDNW, each printer may broadcast a probe request transmission including an SSID of the WFDNW (i.e., a candidate SSID including a character string "candidate"). The terminal device 100 may be configured to monitor whether a probe request including the candidate SSID is received, and to execute the processing of S70 in accordance with the reception number of the probe requests including the candidate SSID. Likewise, in S240 of FIG. 4, S340 of FIG. 5, S440 of FIG. 6 and S640 of FIG. 8, the terminal device 100 may be configured not to broadcast the probe request transmission, to monitor whether a probe request including a target SSID is received, and to search a printer that forms a WFDNW identified by the target SSID. The "search of the first-type (or second-type) master station device" may be executed as a search signal is transmitted, like the illustrative embodiments, or may be executed without a search signal being transmitted.

Modified Embodiment 6

In the second illustrative embodiment, when two or more target SSIDs have been found (two or more in S470 of FIG. 6), the terminal device 100 sequentially establishes WFD connection with each of the printers (i.e., the printers 200, 300) identified by the two or more target SSIDs, and transmits the wireless information 138 (S510, S512, S530, S532 of FIG. 7). In a modified embodiment, when two or more target SSIDs have been found (two or more in S470), the terminal device 100 may end the processing without establishing WFD connection with any printer and without transmitting the wireless information 138 to any printer. When two or more second-type master station devices are found, the "establishment unit" may not establish wireless connection with any of the two or more second-type master station devices, and the "transmission unit" may not transmit the wireless information in the memory to any of the two or more second-type master station devices.

Modified Embodiment 7

In the respective illustrative embodiments, each of the printers 200, 300 may automatically shift to the G/O state without receiving the probe request of S14 of FIG. 2 from the terminal device 100, until predetermined time from the power supply ON elapses. The "first shift unit" may be configured to shift a state of the master station device from a state where the master station device does not operate as a master station of the first-type wireless network to a first master station state, even when the predetermined signal is not received from the communication device.

Modified Embodiment 8

The "master station device" is not limited to the printer capable of executing the print function, and may be a scanner capable of executing the scan function or a device (for example, a PC, a server or a portable terminal (a mobile phone, a smart phone, a PDA or the like)) configured to execute functions (for example, a display function of an image, a calculation function of data and the like) different from the print and scan functions. The "master station device" includes all devices that can operate as a master station of a wireless network.

Modified Embodiment 9

In the respective illustrative embodiments, the SSID "candidate200" stored in the printer 200 and the SSID "candidate300" stored in the printer 300 are different from each other. However, the SSIDs may be the same (for example, an SSID "candidate"). Likewise, the SSID "target200" stored in the printer 200 and the SSID "target300" stored in the printer 300 may be the same (for example, an SSID "target").

Modified Embodiment 10

In the respective illustrative embodiments, the respective processing of FIGS. 2 to 8 is implemented by the software (i.e., the programs 136, 236). However, at least one of the respective processing of FIGS. 2 to 8 may be implemented by the hardware such as a logical circuit.

Also, the technical elements described in the specification or drawings exhibit the technical usefulness individually or by a variety of combinations and are not limited to combinations defined in the claims at the time of the filing of the subject application. Also, the technologies described in the specification or drawings accomplish a plurality of purposes at the same time, and one accomplishment of the purposes also has the technical usefulness.

What is claimed is:

1. A communication device comprising:
    a communication interface;
    a processor; and
    a memory storing wireless information and instructions, the wireless information being used for establishing first wireless connection with a specific access point, the instructions, when executed by the processor, causing the communication device to perform:
        searching a first-type master station device, the first-type master station device being configured to operate as a master station of a first-type wireless network, the first-type wireless network being identified by a first wireless identifier comprising a first predetermined character string;
        searching a second-type master station device in a case that two or more first-type target devices are found as a search result for the first-type master station device, the second-type master station device being configured to operate as a master station of a second-type wireless network, the second-type wireless network being identified by a second wireless identifier comprising a second predetermined character string, the second-type wireless network being a second wireless connection with a second-type target device, the second wireless connection being different from the first wireless connection, and the second wireless identifier being different from the first wireless identifier;
        when a number of second-type target device, which is the second-type master station device, found as a search result for the second-type master station device is one, establishing the second wireless connection with the second-type target device and joining the second-type wireless network, the second-type target device being configured to shift from a first state of operating as the master station of the first-type wireless network identified by the first wireless identifier comprising the first predetermined character string to a second state of operating as the master station of the second-type wireless network after the searching of the first-type master station device; and
        transmitting the wireless information to the second-type target device via the second-type wireless network,
        wherein the second-type target device is a first-type target device with which a shift operation from the first state to the second state has been executed by a user, from among the two or more first-type target devices.

2. The communication device according to claim 1, wherein the memory further stores instructions, when executed by the processor, causing the communication device to perform:
    outputting predetermined information to an output device in a recognizable manner for a user in the case, the predetermined information being for prompting the user to execute a shift operation on a transmission destination device that is to be a transmission destination of the wireless information, the shift operation being for shifting a state of the transmission destination device from the first state to the second state, and
    wherein the establishing of the second wireless connection with said one second-type target device and the joining the second-type wireless network are performed after the shift operation has been executed on the transmission destination device and when the number of the second-type target device, which is the transmission destination device, found as the search result for the second-type master station device is one.

3. The communication device according to claim 1, wherein the searching of the first-type master station device comprises:
    transmitting a search signal through the communication interface; and
    determining whether a response signal, which includes the first wireless identifier comprising the first predetermined character string, is received from the first-type master station device through the communication interface as a response to the search signal.

4. The communication device according to claim 1, further comprising:
    an operation device configured to receive a user's operation,
    wherein the searching of the first-type master station device is performed based on the operation device receiving a predetermined operation, and
    wherein the searching of the second-type master station device is performed even when the operation device does not receive an operation after performing the searching of the first-type master station device.

5. The communication device according to claim 1, wherein when two or more second-type master station devices are found as the search result for the second-type master station device, the memory further stores instructions, when executed by the processor, causing the communication device to perform:
    establishing the second wireless connection with any one of the two or more second-type master station devices and joining the second-type wireless network; and
    transmitting the wireless information in the memory to said one second-type master station device via the second-type wireless network, and
    wherein when no second-type master station device is found as the search result for the second-type master station device, the memory further stores instructions, when executed by the processor, causing the communication device not to perform transmitting the wireless information in the memory externally.

6. The communication device according to claim 1, wherein when two or more second-type master station devices are found as the search result for the second-type master station device, the memory further stores instructions, when executed by the processor, causing the communication device to perform:
    sequentially establishing the second wireless connection with each of the two or more second-type master station devices and joining the second-type wireless networks that are to be formed by the respective second-type master station devices; and transmitting the wireless information in the memory to each of the two or more second-type master station devices via each of the second-type wireless networks, and wherein when no second-type master station device is found as the search result for the second-type master station device, the memory further stores instructions, when executed by the processor, causing the communication device not to perform transmitting the wireless information in the memory externally.

7. The communication device according to claim 1,
wherein the memory stores therein the first predetermined character string and the second predetermined character string in advance before the searching of the first-type master station device,
wherein the searching of the first-type master station device is performed based on the first predetermined character string in the memory, and
wherein the searching of the second-type master station device is performed based on the second predetermined character string in the memory in the case.

8. A non-transitory computer-readable medium having a computer program stored thereon and readable by a computer of a communication device, the computer program, when executed by the computer, causes a computer to perform operations comprising:

searching a first-type master station device, the first-type master station device being configured to operate as a master station of a first-type wireless network, the first-type wireless network being identified by a first wireless identifier comprising a first predetermined character string searching a second-type master station device in a second case that two or more first-type target devices are found as a search result for the first-type master station device, the second-type master station device being configured to operate as a master station of a second-type wireless network, the second-type wireless network being a wireless network identified by a second wireless identifier comprising a second predetermined character string, the second-type wireless network being a second wireless connection with a second-type target device, and the second wireless identifier being different from the first wireless identifier;

when a number of second-type target device, which is the second-type master station device, found as a search result for the second-type master station device is one, establishing the second wireless connection with the second-type target device and joining the second-type wireless network, the second-type target device being configured to shift from a first state of operating as the master station of the first-type wireless network identified by the first wireless identifier comprising the first predetermined character string to a second state of operating as the master station of the second-type wireless network after the searching of the first-type master station device; and transmitting wireless information in a memory of the communication device to the second-type target device via the second-type wireless network, the wireless information being used for establishing a first wireless connection with a specific access point, the first wireless connection being different from the second wireless connection, wherein the second-type target device is the first-type target device with which a shift operation from the first state to the second state has been executed by a user, from among the two or more first-type target devices.

9. A master station device configured to operate as a master station of a wireless network, the master station device comprising:
an operation device;
a processor; and
a memory storing therein a first wireless identifier, a second wireless identifier that is different from the first wireless identifier and instructions, when executed by the processor, causing the master station device to perform:

shifting a state of the master station device from a non-master state where the master station device does not operate as a master station of a first-type wireless network to be identified by the first wireless identifier to a first master state where the master station device operates as a master station of the first-type wireless network to be identified by the first wireless identifier;

receiving a request for the first wireless identifier;
transmitting the first wireless identifier based on the received request for the first wireless identifier;

shifting the state of the master station device operating as the master station of the first-type wireless network identified by the first wireless identifier from the first master state to a second master state, where the master station device operates as a master station of a second-type wireless network identified by the second wireless identifier, based on the operation device receiving a shift operation while the master station device is in the first master state;

receiving a request for the second wireless identifier;
transmitting the second wireless identifier based on the received request for the second wireless identifier;

establishing, after transmitting the second wireless identifier, a first wireless connection with a communication device and joining the communication device to the second-type wireless network as a slave station, while the master station device is in the second master state;

receiving, after establishing the first wireless connection, wireless information from the communication device via the second-type wireless network, the wireless information being used when the communication device has established a second wireless connection with an access point, the second wireless connection being different from the first wireless connection; and establishing the second wireless connection with the access point based on the wireless information.

10. The master station device according to claim 9, wherein the shifting of the state of the master station device from the non-master state to the first master state is performed based on receiving a predetermined signal from the communication device.

11. The master station device according to claim 9,
wherein the first wireless identifier comprises a first predetermined character string, and
wherein the second wireless identifier comprises a second predetermined character string that is different from the first predetermined character string.

12. A non-transitory computer-readable medium having a computer program stored thereon and readable by a computer of a master station device that is configured to operate as a master station of a wireless network, the computer program, when executed by the computer, causes the computer to perform operations comprising:

shifting a state of the master station device from a non-master state where the master station device does not operate as a master station of a first-type wireless network to be identified by a first wireless identifier stored in a memory of the master station device to a first master state where the master station device operates as a master station of the first-type wireless network to be identified by the first wireless identifier;

receiving a request for the first wireless identifier;

transmitting the first wireless identifier based on the received request for the first wireless identifier;

shifting the state of the master station device operating as the master station of the first-type wireless network identified by the first wireless identifier from the first master state to a second master state, where the master station device operates as a master station of a second-type wireless network to be identified by a second wireless identifier stored in the memory, based on an operation device of the master station device receiving a shift operation while the master station device is in the first master state, the second wireless identifier being different from the first wireless identifier;

receiving a request for the second wireless identifier;

transmitting the second wireless identifier based on the received request for the second wireless identifier;

establishing, after transmitting the second wireless identifier, a first wireless connection with a communication device and joining the communication device to the second-type wireless network as a slave station, while the master station device is in the second master state;

receiving, after establishing the first wireless connection, wireless information from the communication device via the second-type wireless network, the wireless information being used when the communication device has established a second wireless connection with an access point, the second wireless connection being different from the first wireless connection; and establishing the second wireless connection with the access point based on the wireless information.

* * * * *

UNITED STATES PATENT AND TRADEMARK OFFICE
CERTIFICATE OF CORRECTION

| | |
|---|---|
| PATENT NO. | : 10,136,461 B2 |
| APPLICATION NO. | : 15/249558 |
| DATED | : November 20, 2018 |
| INVENTOR(S) | : Akiko Abe |

It is certified that error appears in the above-identified patent and that said Letters Patent is hereby corrected as shown below:

In the Claims

In Column 21, Claim 12, Line 19:
Please delete "to be identified" and insert --identified--

Signed and Sealed this
Twenty-sixth Day of February, 2019

Andrei Iancu
*Director of the United States Patent and Trademark Office*